(12) United States Patent
Harai

(10) Patent No.: US 12,513,250 B2
(45) Date of Patent: Dec. 30, 2025

(54) COMPONENT LIFE PREDICTION METHOD THAT MAKES IT POSSIBLE TO ENHANCE ACCURACY OF PREDICTION OF COMPONENT LIFE, COMPONENT LIFE PREDICTION SYSTEM, AND STORAGE MEDIUM

(71) Applicant: CANON KABUSHIKI KAISHA, Tokyo (JP)

(72) Inventor: Yuriko Harai, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 217 days.

(21) Appl. No.: 18/415,104

(22) Filed: Jan. 17, 2024

(65) Prior Publication Data

US 2024/0259504 A1     Aug. 1, 2024

(30) Foreign Application Priority Data

Jan. 30, 2023   (JP) ................................ 2023-011809

(51) Int. Cl.
*H04N 1/04* (2006.01)
*H04N 1/00* (2006.01)

(52) U.S. Cl.
CPC ..... *H04N 1/00068* (2013.01); *H04N 1/00037* (2013.01)

(58) Field of Classification Search
USPC ....................................................... 358/1.15
See application file for complete search history.

(56) References Cited

U.S. PATENT DOCUMENTS

| 11,461,057 B2 | 10/2022 | Harai | |
|---|---|---|---|
| 2005/0225909 A1* | 10/2005 | Yoshizaki | H02H 3/33 361/42 |
| 2018/0373233 A1* | 12/2018 | Goto | G06N 3/09 |

FOREIGN PATENT DOCUMENTS

JP      2019-215601 A    12/2019

\* cited by examiner

*Primary Examiner* — Cheukfan Lee
(74) *Attorney, Agent, or Firm* — VENABLE LLP

(57) ABSTRACT

A component life prediction method that makes it possible to enhance, when predicting a time at which a component provided in an apparatus reaches its life end, the accuracy of this prediction. A method of predicting the life end of a component provided in an apparatus. An operation state of the apparatus is determined, which can reduce the service life of the component. A remaining useful life is predicted in which the component can be used until the component reaches the life end. Cumulative time is predicted which is determined by accumulating time in the operation state. A time at which the component reaches the life end is predicted based on a result of predicting the remaining useful life and a result of predicting the cumulative time.

14 Claims, 16 Drawing Sheets

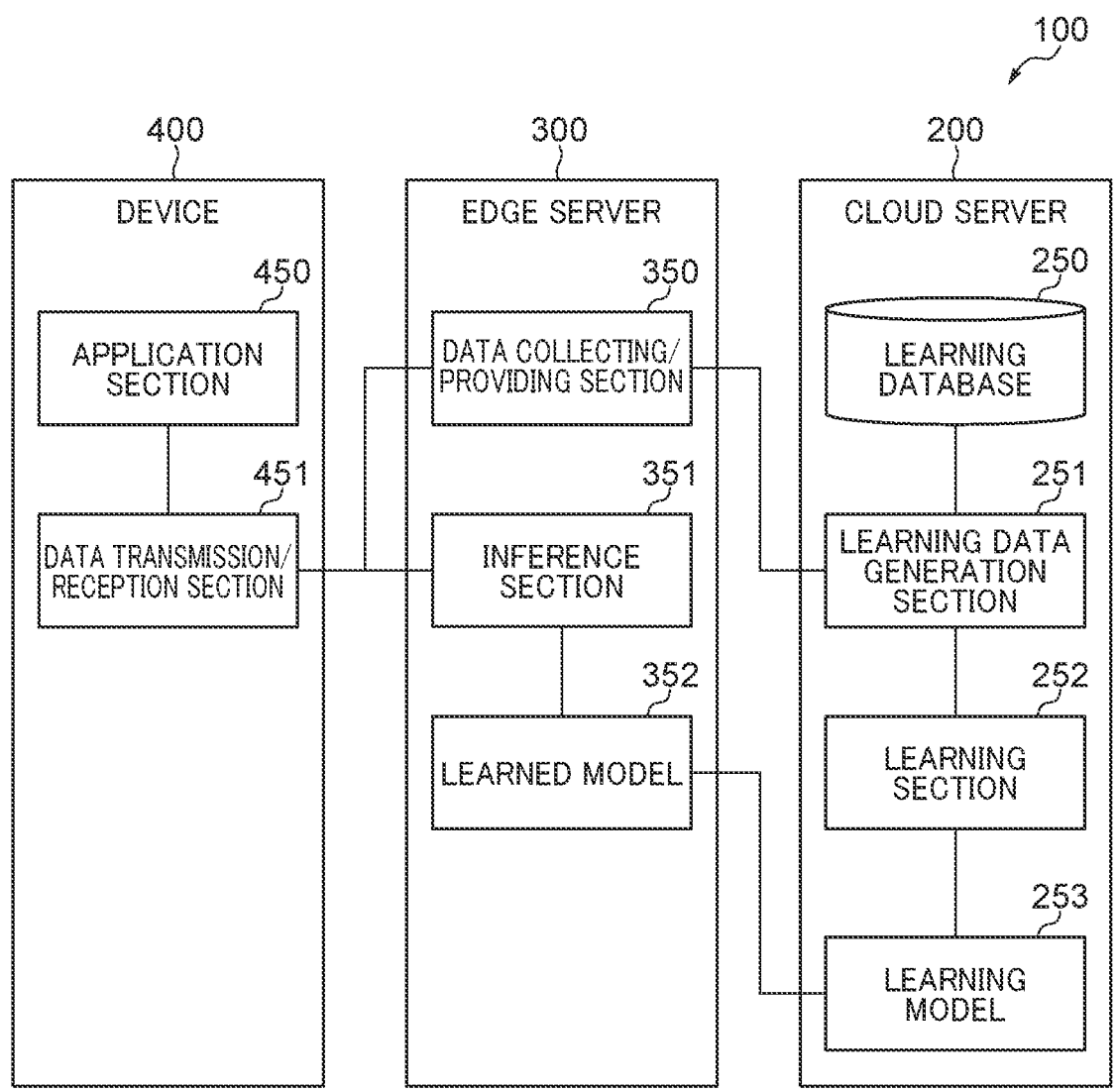

FIG. 7

| COMPONENT NAME | TARGET STATE |
|---|---|
| PRINT SECTION HEATER | PRINTING STATE |
| CLEANING ROLLER | POST-PRINTING STATE |
| HEAD C | PRINTING STATE |
| HEAD M | PRINTING STATE |
| ... | ... |
| CONTROL CIRCUIT BOARD A | STANDBY STATE, PRINTING STATE |

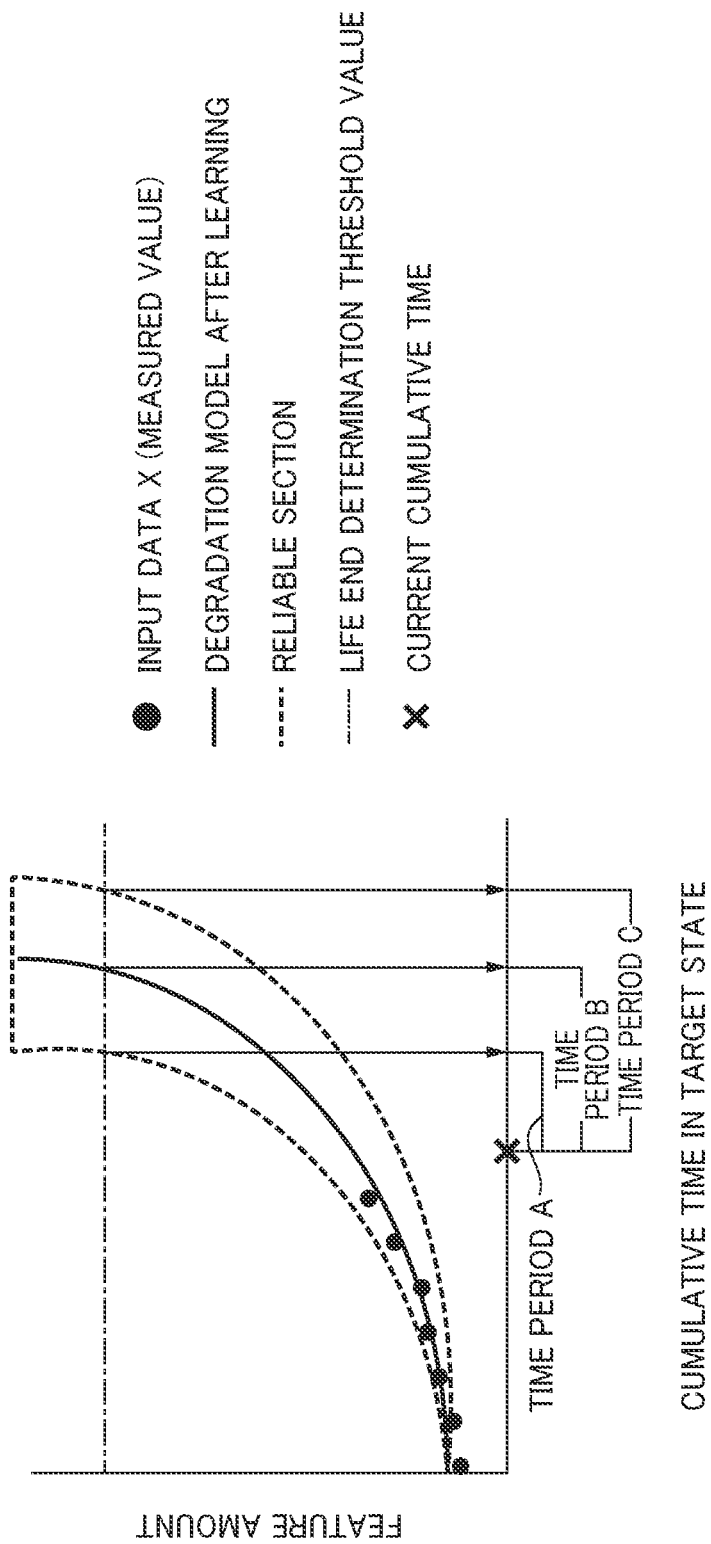

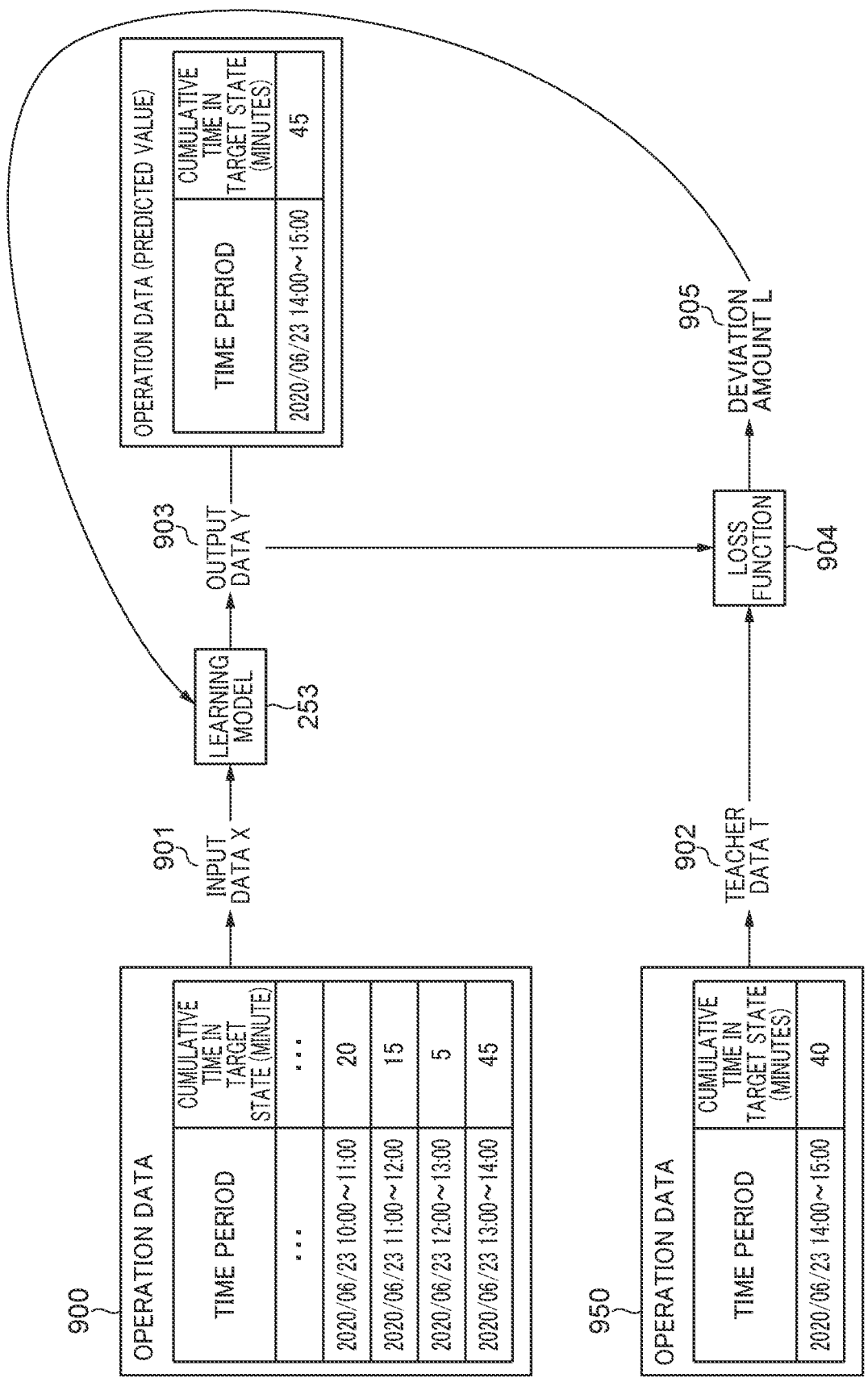

FIG. 15

COMPONENT REPLACEMENT RECOMMENDATION NOTIFICATION — 1500

| COMPONENT NAME 1501 | LIFE END REACHING DATE & TIME 1502 | ACTION STATUS 1503 |
|---|---|---|
| ☑ PRINT SECTION HEATER | 2020/06/23 14:00 | NO ACTION |
| ☐ HEAD (CYAN) | 2020/06/30 15:00 | ORDERED |

CLOSE    ORDER 1504

COMPONENT LIFE PREDICTION METHOD THAT MAKES IT POSSIBLE TO ENHANCE ACCURACY OF PREDICTION OF COMPONENT LIFE, COMPONENT LIFE PREDICTION SYSTEM, AND STORAGE MEDIUM

BACKGROUND OF THE INVENTION

Field of the Invention

The present invention relates to a component life prediction method that makes it possible to enhance the accuracy of prediction of a component life, a component life prediction system, and a storage medium.

Description of the Related Art

Conventionally, there is a concern that in a case where a variety of apparatuses, such as printers, are stopped due to a failure, the productivity and the like of the stopped apparatus are lowered. To prevent this lowering, for example, a measure is taken that the life of a component forming an apparatus is predicted to prompt a user to replace the component before the component reaches its life end. For example, Japanese Laid-Open Patent Publication (Kokai) No. 2019-215601 discloses a management system that predicts a remaining usable time of a periodic replacement component, based on a remaining operation time left until an abnormality occurs in an inkjet recording apparatus, a prediction value of the number of times of printing to be performed by the recording apparatus, and an average service life of the periodic replacement component forming the recording apparatus. Further, the management system described in Japanese Laid-Open Patent Publication (Kokai) No. 2019-215601 can prompt a user to replace a periodic replacement component by displaying the remaining usable time of the periodic replacement component.

However, even when the user has confirmed the remaining usable time, the user cannot accurately grasp the date and time at which the component actually reaches its life end, and hence it is difficult to plan the replacement of the component. For example, in the case of the inkjet recording apparatus, a long-term continuous operation is not expected in general, and further, the use tendency varies between users. In this case, in the management system described in Japanese Laid-Open Patent Publication (Kokai) No. 2019-215601, the remaining usable time does not directly indicate the date and time at which the component actually reaches its life end. Further, the operating state of the apparatus, which can reduce the service life, varies between components, and hence naturally, the remaining use time also varies between components. Further, even if the remaining usable time is long, the time until the component reaches its life end is not necessarily long. For example, the inkjet recording apparatus has a component whose service life is reduced merely due to the ON state of the power of the apparatus, and a component whose service life is reduced when the inkjet recording apparatus is in a printing state. Then, in a case where the remaining usable times of these components are the same, the former component is expected to reach its life end earlier than the latter component, but the remaining usable time cannot accurately express this state. Further, it is difficult to collect the service life data (failure data) of the components in advance, and particularly, it is further difficult to predict the service life with respect to a component whose service life is unknown.

SUMMARY OF THE INVENTION

The present invention provides a component life prediction method that makes it possible to enhance, when predicting a time at which a component provided in an apparatus reaches its life end, the accuracy of this prediction, a component life prediction system, and a storage medium.

In a first aspect of the present invention, there is provided a method of predicting a life end of a component provided in an apparatus, including determining an operation state of the apparatus, which can reduce the service life of the component, predicting a remaining useful life in which the component can be used until the component reaches the life end, predicting cumulative time determined by accumulating time in the operation state, and predicting a time at which the component reaches the life end, based on a result of predicting the remaining useful life and a result of predicting the cumulative time.

In a second aspect of the present invention, there is provided a component life prediction system that predicts a life end of a component provided in an apparatus, including a determination unit configured to determine an operation state of the apparatus, which can reduce the service life of the component, a first prediction unit configured to predict a remaining useful life in which the component can be used until the component reaches the life end, a second prediction unit configured to predict cumulative time determined by accumulating time in the operation state, and a third prediction unit configured to predict a time at which the component reaches the life end, based on a result of prediction performed by the first prediction unit and a result of prediction performed by the second prediction unit.

According to the present invention, it is possible to enhance, when predicting a time at which a component provided in an apparatus reaches its life end, the accuracy of this prediction.

Further features of the present invention will become apparent from the following description of exemplary embodiments (with reference to the attached drawings).

BRIEF DESCRIPTION OF THE DRAWINGS

FIG. 5 is a block diagram showing a software configuration of the processing system.

FIG. 7 is a diagram showing an example of a relationship between components and target states.

FIGS. 8A and 8B are conceptual diagrams showing an input and an output to and from a learning model when the learning model predicts a remaining useful life, and a relationship between cumulative time and the remaining useful life, respectively.

FIG. 9 is a conceptual diagram showing an input and an output to and from the learning model when the learning model predicts cumulative time in the target state when learning is performed.

FIG. 15 is a diagram showing an example of a component replacement recommendation notification screen.

DESCRIPTION OF THE EMBODIMENTS

The present invention will now be described in detail below with reference to the accompanying drawings showing embodiments thereof. However, the following description of the configurations of the embodiments is given by way of example, and the scope of the present invention is not limited to the described configurations of the embodiments. For example, each component of the present invention can be replaced by a desired component which can exhibit the same function. Further, a desired component can be added.

Figure 1:
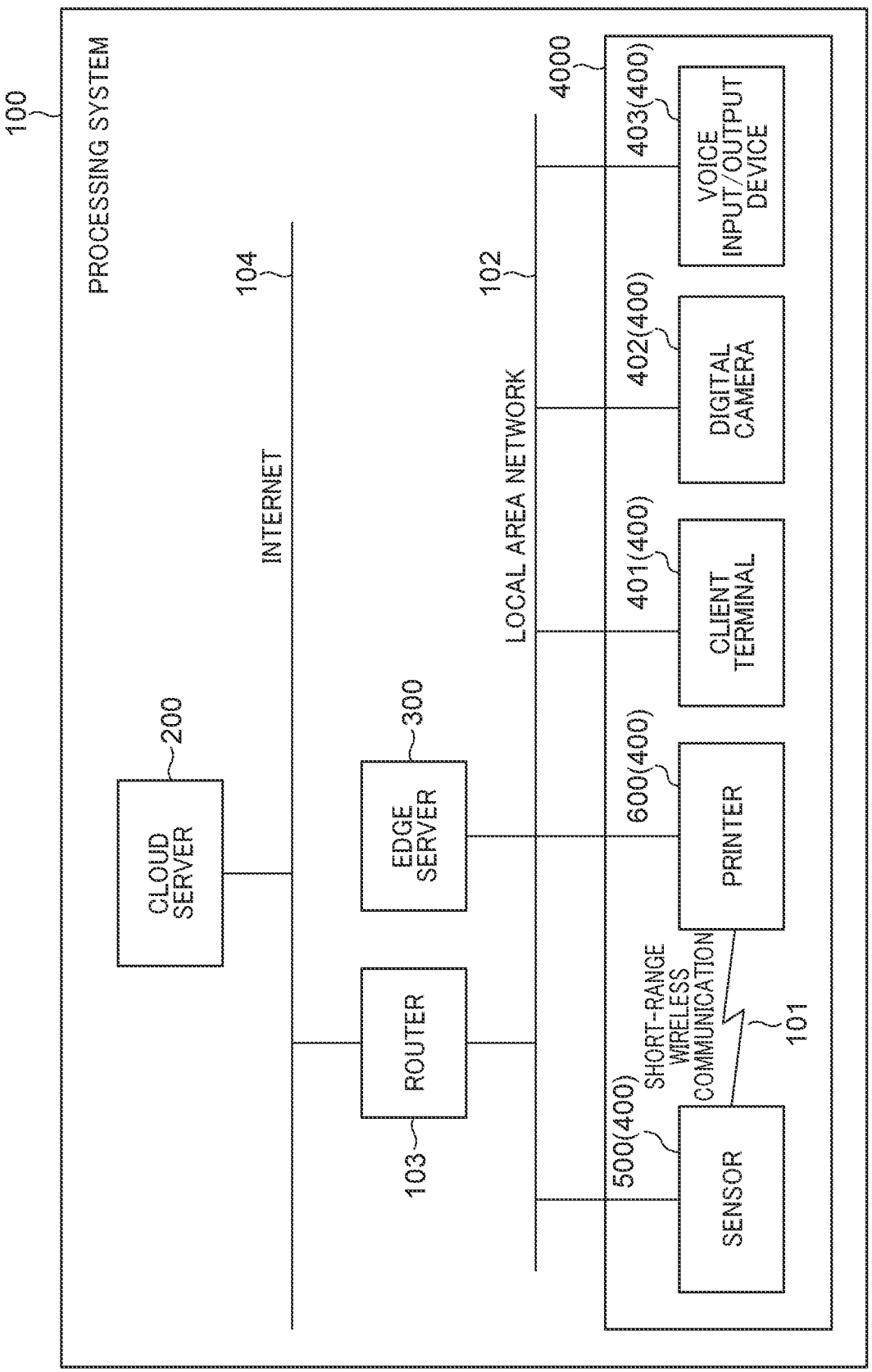
FIG. 1 is a block diagram showing the configuration of a processing system.

FIG. 1 is a block diagram showing the configuration of a processing system. The processing system shown in FIG. 1, denoted by reference numeral 100, is a component life prediction system that predicts the end of the service life of each of components provided in each of a plurality of devices 400. The processing system 100 includes a cloud server 200, an edge server 300, and a device group 4000 formed by the plurality of devices 400, and these are communicably connected via a local area network (LAN) 102 and the Internet 104. In the present embodiment, as the devices 400 forming the device group 4000, there are illustrated a sensor 500, a printer 600, a client terminal 401, a digital camera 402, and a voice input/output device 403. The client terminal 401 is, for example, a personal computer, a work station, a smartphone, or a tablet terminal. Note that the devices 400 can be, for example, home electrical appliances, such as a refrigerator, a television, and an air conditioner, an industrial product manufactured from raw material, or a manufacturing apparatus that manufactures industrial products.

The devices 400 are communicably connected to each other via the local area network 102. Further, each device 400 can be connected to the Internet 104 via a router 103 connected to the local area network 102. Note that although the router 103 is illustrated in FIG. 1 as a device that connects between the local area network 102 and the Internet 104, this is not limitative. For example, the router 103 can be a device having a wireless LAN access point function and provided as a component of the local area network 102. In this case, each device 400 can be not only connected to the router 103 by wired LAN, but also connected to the local area network 102 by wireless LAN. With this, for example, the printer 600 and the client terminal 401 can be connected by wired LAN, whereas the printer 600 and the sensor 500 can be connected by wireless LAN. Note that although the device having the wireless LAN access point function can be the router 103, this is not limitative, but for example, a device different from the router 103 can be used.

Each device 400 and the edge server 300 can communicate with the cloud server 200 via the local area network 102 (router 103) and the Internet 104. Further, each device 400 and the edge server 300 can communicate with each other via the local area network 102, but this is not limitative. For example, each device 400 and the edge server 300 can be enabled to communicate with each other by using wireless communication other than wireless LAN communication, such as LPWA, ZigBee, Bluetooth, and short-range wireless communication, wired connection, such as the USB, infrared communication, and so forth. Further, the devices 400 can also communicate with each other via the local area network 102. Further, the sensor 500 and the printer 600 can communicate with each other by using short-range wireless communication 101. As the short-range wireless communication 101, for example, wireless communication conforming to the Bluetooth (registered trademark) standard or the near field communication (NFC) standard can be used, but this is not limitative. Further, the sensor 500 can be a device incorporating a variety of sensors or a device that can hold a variety of data.

Figure 2:
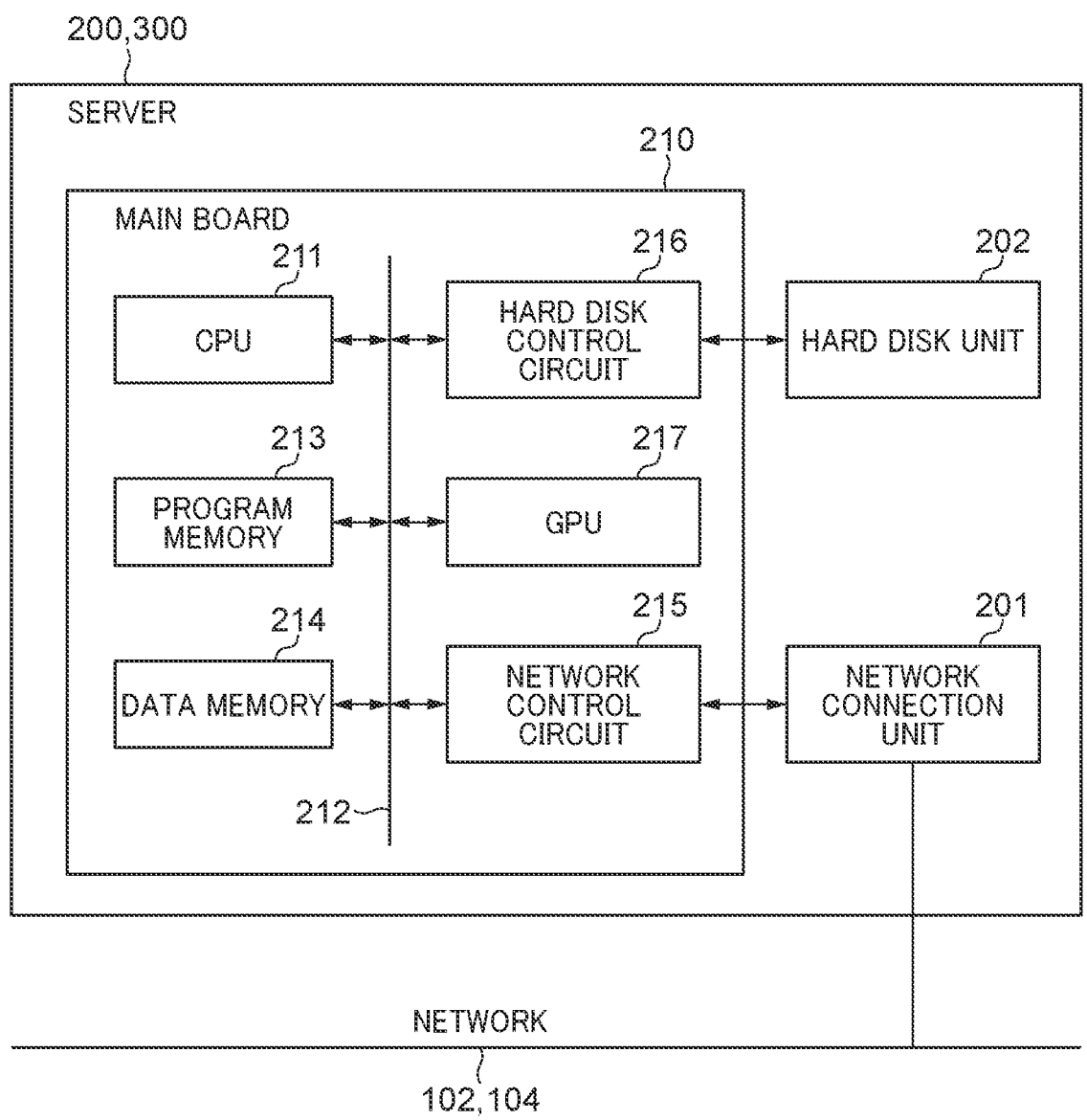
FIG. 2 is a block diagram showing a hardware configuration of a cloud server and an edge server.

FIG. 2 is a block diagram showing a hardware configuration of the cloud server and the edge server. As shown in FIG. 2, in the present embodiment, the cloud server 200 and the edge server 300 are servers having the same hardware configuration. Here, the cloud server 200 is described as a representative. The cloud server 200 includes a main board 210, a network connection unit 201, and a hard disk unit 202. The main board 210 is configured to control the overall operation of the cloud server 200 and includes a central processing unit (CPU) 211, a program memory 213, a data memory 214, a network control circuit 215, a hard disk control circuit 216, and a graphics processing unit (GPU) 217. The CPU 211, the program memory 213, the data memory 214, the network control circuit 215, the hard disk control circuit 216, and the GPU 217 are communicably connected to each other via an internal bus 212. The CPU 211 operates according to control programs stored in the program memory 213 and the contents stored in the data memory 214. The CPU 211 controls the network connection unit 201 via the network control circuit 215. With this, the cloud server 200 is connected to a network, such as the Internet 104 and the local area network 102, thereby being enabled to communicate with another apparatus, such as the device 400. The CPU 211 can read and write data from and into the hard disk unit 202 via the hard disk control circuit 216. The hard disk unit 202 stores not only an operating system loaded into the program memory 213 for use, control software of the cloud server 200, and the like, but also a variety of data.

The GPU 217 can execute a variety of calculation processing operations in place of the CPU 211. The GPU 217 can perform efficient calculation by processing more data in parallel. Therefore, in a case where learning, such as deep learning, is performed a plurality of times by using a learning model, it is effective to use the GPU 217 to perform learning. Therefore, in the present embodiment, the GPU 217 is used in addition to the CPU 211 for a process performed by a learning section 252, described hereinafter. Specifically, in a case where a learning program including a learning model is executed, the learning is performed by the CPU 211 and the GPU 217 that cooperate to perform calculation. Note that the process performed by the learning section 252 can be performed by the CPU 211 alone, or by the GPU 217 alone. Further, similar to the learning section 252, an inference section 351, described hereinafter, can also use the GPU 217. In the present embodiment, the cloud server 200 and the edge server 300 are servers having the same hardware configuration as mentioned above, but this is not limitative. For example, although the GPU 217 is included in the cloud server 200 in the illustrated example, it can be omitted from the edge server 300. Further, in a case where cloud server 200 and the edge server 300 both include the GPU 217, these GPUs 217 can be different in performance from each other.

Figure 3A:
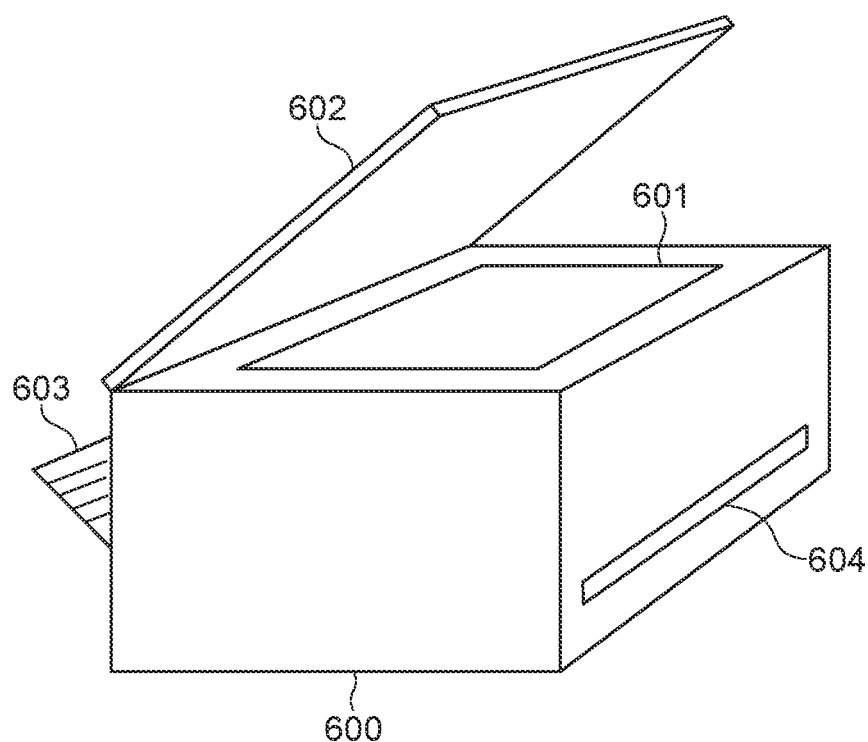
FIG. 3A is a perspective view showing the appearance of a printer.
Figure 3B:
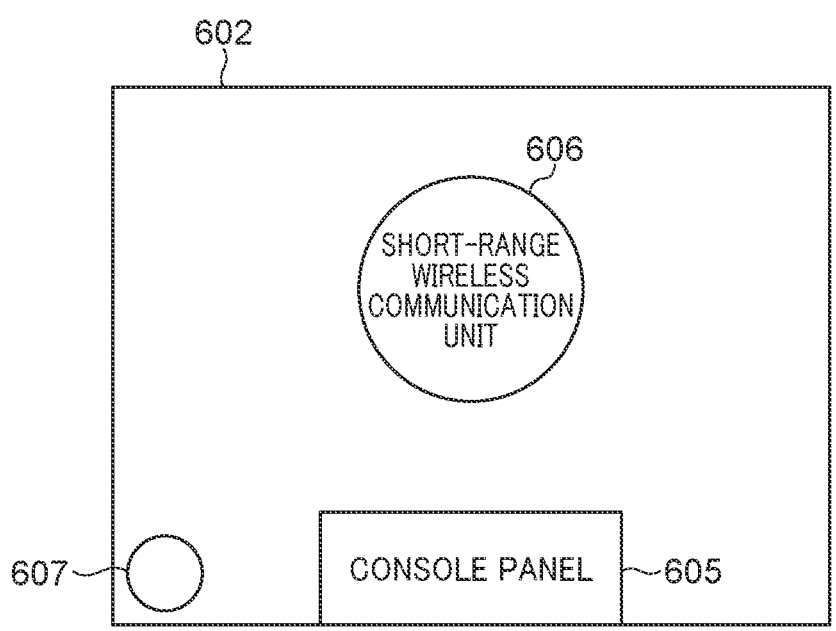
FIG. 3B is a top view showing the appearance of the printer.

FIGS. 3A and 3B each show the appearance of the printer 600. FIG. 3A is a perspective view, and FIG. 3B is a top view. The printer 600 shown in FIGS. 3A and 3B is, for example, a multifunction printer (MFP). As shown in FIG. 3A, the printer 600 includes an original platen glass 601, an original platen glass pressing plate 602, a print sheet insertion port 603, and a print sheet discharge port 604. The original platen glass 601 is a transparent platen made of glass, on which an original can be placed when reading the same by a scanner section 615 (see FIG. 4). The original platen glass pressing plate 602 is a cover that prevents, when the original is read by the scanner section 615, the original from floating up, by pressing the original down against the original platen glass 601, and also prevents outside light from entering the scanner section 615. The print sheet insertion port 603 is an insertion port from which various sizes of print sheets are inserted. The print sheets set on the print sheet insertion port 603 are conveyed to a print section 617 (see FIG. 4) one by one. Each print sheet thus conveyed to the print section 617 is subjected to desired printing in the print section 617 and is discharged from the print sheet discharge port 604. As shown in FIG. 3B, the printer 600 includes a console panel 605 provided on the original platen glass pressing plate 602, a short-range wireless communication unit 606, and a wireless LAN antenna 607. The short-range wireless communication unit 606 is for performing short-range wireless communication and enables the processing system 100 to communicate with the sensor 500 by the short-range wireless communication 101. The wireless LAN antenna 607 is an antenna for performing communication via the local area network 102 by wireless LAN.

Figure 4:
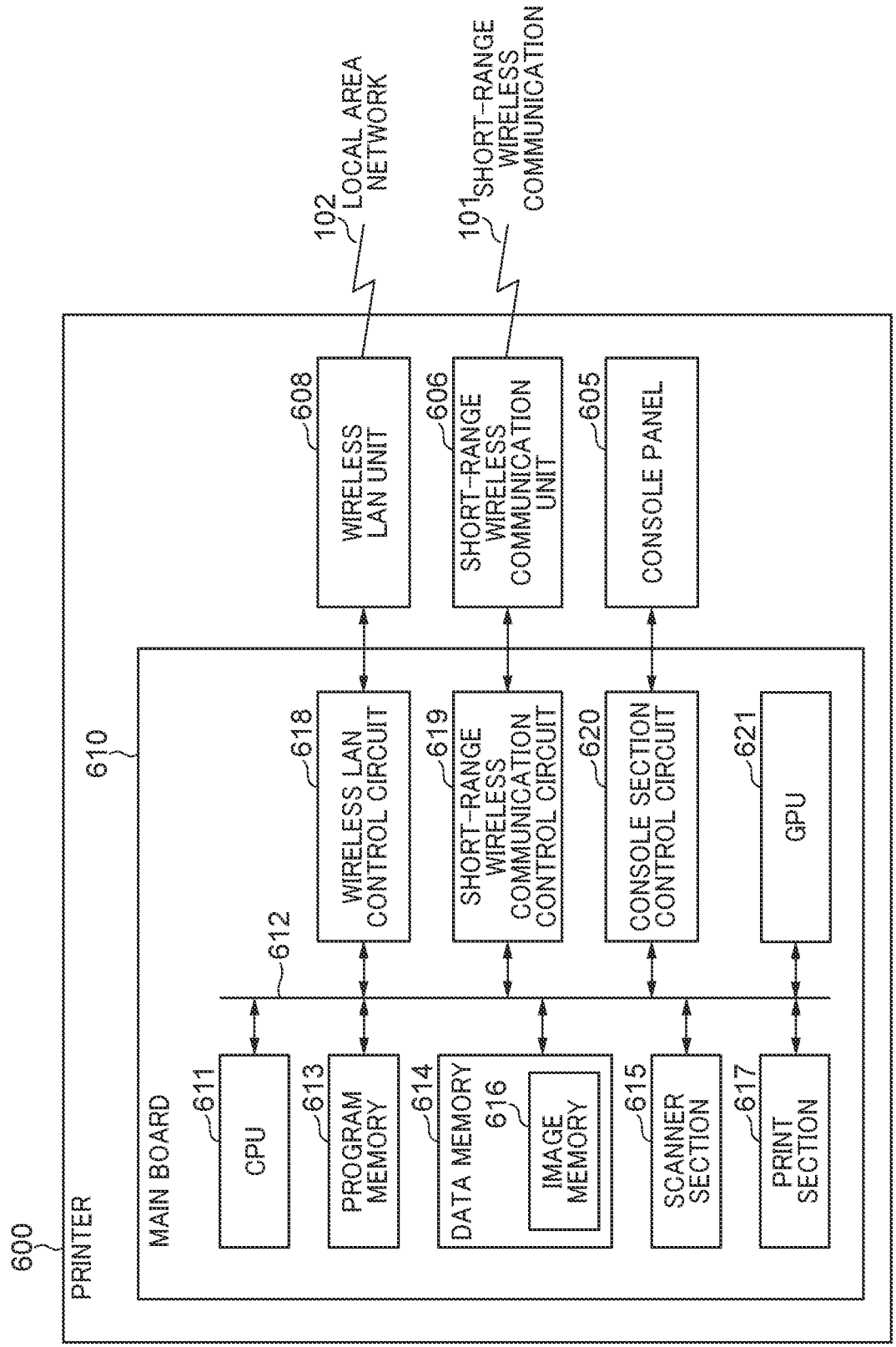
FIG. 4 is a block diagram showing a hardware configuration of the printer.

FIG. 4 is a block diagram showing a hardware configuration of the printer. As shown in FIG. 4, the printer 600 includes a main board 610, the short-range wireless communication unit 606, a wireless LAN unit 608, and the console panel 605. The main board 610 controls the overall operation of the printer 600. The main board 610 includes a CPU 611, a program memory 613, a data memory 614, the scanner section 615, the print section 617, a wireless LAN control circuit 618, a short-range wireless communication control circuit 619, a console section control circuit 620, and a GPU 621. These components are communicably connected to each other via an internal bus 612. The CPU 611 operates according to control programs stored in the program memory 613 and the contents stored in the data memory 614 in the form of a RAM disk. The CPU 611 controls the scanner section 615 to read an original set on the original platen glass 601 and stores the read data in an image memory 616 in the data memory 614. Further, the CPU 611 can control the print section 317 to print an image stored in the image memory 616 on a recording medium. The CPU 611 can control the wireless LAN unit 608 via the wireless LAN control circuit 618. With this, the printer 600 can perform wireless LAN communication with the other devices 400 on the local area network 102. Further, the CPU 611 can control the short-range wireless communication unit 606 via the short-range wireless communication control circuit 619. With this, the printer 600 can detect connection to the sensor 500 and transmit and receive data to and from the sensor 500. The CPU 611 controls the console panel control circuit 620, thereby being capable of displaying a state of the printer 600 and a function selection menu on the console panel 605 and receiving a user operation input from the console panel 605. The console panel 605 has a back light. The CPU 611 can control the lighting-on/off of the back light via the console panel control circuit 620. By lighting off the back light, it is possible to suppress power consumption of the printer 600.

FIG. 5 is a block diagram showing a software configuration of the processing system. Note that FIG. 5 shows components of the software configuration of the processing system 100, which are associated with the processing of learning and inference, and the other software components are omitted. The omitted software components include operating systems operating on the cloud server 200, the edge server 300, and each device 400, respectively, a variety of middleware, and an application for maintenance, and so forth. As shown in FIG. 5, the cloud server 200 includes a learning database 250, a learning data generation section 251, the learning section 252, and a learning model 253. The learning database 250 stores data for learning, which is used by the learning section 252. The data for learning stored in the learning database 250 includes operation data used when each device 400 operates, time-series sensor data output from the sensor 500, and so forth. The learning data generation section 251 is a module that generates data for learning, which can be processed by the learning section 252, based on data received from an external apparatus, such as the edge server 300. The data for learning is input to the learning section 252. The data for learning is sequentially stored in the learning database 250. The learning section 252 is a program module that receives the data for learning from the learning data generation section 251 and causes the learning model 253 to execute learning. Note that to improve the accuracy of learning of the learning model 253, the learning section 252 can perform, for example, processing for tuning hyper parameters of the learning model 253. The learning model 253 can also accumulate the hyper parameters, and results of learning, including an inference error. The learning model 253 is delivered to the edge server 300 as a learned model and is used for inference performed in the edge server 300.

As shown in FIG. 5, the edge server 300 includes a data collecting/providing section 350, the inference section 351, and a learned model 352. The data collecting/providing section 350 is a module that transmits data received from a data transmission/reception section 451 of the device 400 and data collected by the edge server 300 itself to the learning data generation section 251 as a data group to be used for learning in the cloud server 200. The inference section 351 is a program module that executes inference using the learned model 352 based on data transmitted from the device 400. The inference section 351 transmits an execution result of the inference to the data transmission/reception section 451 of the device 400 as a response. The data transmitted from the device 400 as a response is input to the inference section 351. The learned model 352 is used for inference performed in the edge server 300. Note that although the learned model 352 is the same as the learning model 253 as described hereinafter, this is not limitative, but for example, the learned model 352 can be generated by extracting part of the learning model 253. The learned model 352 stores the learning model 253 delivered from the cloud server 200. The learned model 352 can be the same as all of the learning model 253, i.e. the same as the learning model 253, or can be formed by extracting part necessary for inference in the edge server 300 from the learning model 253.

As shown in FIG. 5, the device 400 includes an application section 450 and the data transmission/reception section 451. The application section 450 is a module that realizes a variety of functions executed by the device 400. Further, the application section 450 is also a module that uses a mechanism of learning and inference performed by machine learning. The data transmission/reception section 451 is a module that requests, for example, learning or inference to the edge server 300. When learning is performed, the data transmission/reception section 451 transmits data used for learning to the data collecting/providing section 350 of the edge server 300 in response to a request from the application section 450. Further, when inference is performed, the data transmission/reception section 451 transmits data used for inference to the data collecting/providing section 350 of the edge server 300 in response to a request from the application section 450. Then, the data transmission/reception section 451 receives a transmission result from the data collecting/providing section 350 and transmits the received result to the application section 450 as a response to an associated request for transmission.

As described above, in the processing system 100, the learning model 253 which has learned in the cloud server 200 is delivered to the edge server 300 as the learned model 352, and the learned model 352 is used for inference, but this is not limitative. For example, which of the cloud server 200, the edge server 300, and the device 400 should be the execution entity of learning and inference can be determined according to conditions, such as distribution of the capacity of hardware, the amount of calculation to be executed, and the volume of data communication. Further, the execution entity can be dynamically changed according to these conditions. In a case where the respective execution entities of learning and inference are different, the execution entity of inference can be configured such that the amount of logics used only for inference and the capacity of the learned model 352 are reduced, and that inference can be executed at high speed. Note that in the processing system 100, the GPU 621 or the CPU 611 of the printer 600 can function as the learning section 252 and the inference section 351. Further, the printer 600 can include components which function as the learning data generation section 251, the data collecting/providing section 350, and the learned model 352. Further, the learning database 250 can be disposed in the edge server 300 or the printer 600.

The processing system 100 having the above-described configuration is a system that realizes a method (component life prediction method) of predicting the end of the service life of each of components provided in the device 400. In the component life prediction, a program for service life prediction is used. The program for service life prediction causes a computer to cause associated components of the processing system 100 to operate. Note that the program for service life prediction can be stored in one of the cloud server 200, the edge server 300, and each device 400, or stored in a state distributed to these apparatuses. Hereafter, the component life prediction will be described.

Figure 6A:
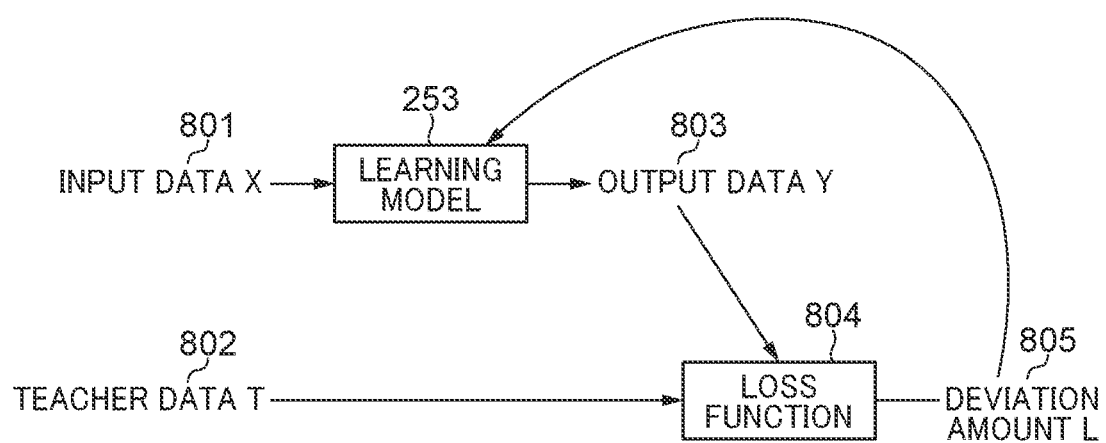
FIGS. 6A and 6B are conceptual diagrams each showing an input/output structure formed when using a learned model.
Figure 6B:
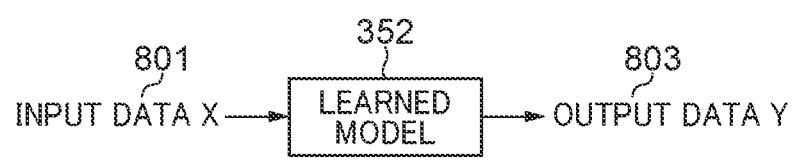

FIGS. 6A and 6B are conceptual diagrams showing input/output structures used when a learning model and a learned model are used, respectively. FIG. 6A is a diagram showing a relationship between the learning model and data input to and output from the learning model when learning is performed. The learning model 253 can perform deep learning. Input data X (801) is data input to the learning model 253. By inputting the input data X (801) to the learning model 253, output data Y (803) is output from the learning model 253 as an inference result. Note that the input data X (801) and the output data Y (803) are changed according to the learning model 253 and an inference target of the learning model 253. For example, as the input data X (801) input to a degradation model that predicts a remaining useful life (RUL) during which a component can be used until the component reaches its life end, time-series sensor data 800 (see FIG. 8A) is used. Further, as the input data X (801) input to a model that predicts a future device use time, operation data 900 (see FIG. 9), such as past device use time, is used. When learning is performed, by supplying the output data Y (803) and teacher data T (802) to a loss function 804, a deviation amount L (805) from a correct answer of the prediction result is determined. Then, weights of the learning model 253 are updated such that the deviation amount L (805) becomes small with respect to a large number of learning data items. In the present embodiment, a machine learning algorithm, such as an exponential degradation model and a Recurrent Neural Network (RNN), is used for prediction of the remaining useful life and cumulative time to be determined by accumulating time in the operating state of the device 400, which state can reduce the service life of the component (hereinafter sometimes referred to as the "target state"). Note that the algorithm is not particularly limited, but for example, Long Short-Term Memory (LSTM), a recurrent neural network, such as a bidirectional RNN, Autoregressive Integrated Moving Average (ARIMA), or Seasonal Auto-Regression Integrated Moving Average (SARIMA) can be used. Further, an ensemble model formed by combining a plurality of learning models can be used. Further, the machine learning is not limited to deep learning, but can be, for example, machine learning using a desired machine learning algorithm, such as support vector machine, logistic regression, or a decision tree.

FIG. 6B is a diagram showing a relationship between a learned model and data input to and output from the learned model when inference is performed. The input data X (801) is data input to the learned model 352. By inputting the input data X (801) to the learned model 352, the output data Y (803) is output from the learned model 352 as an inference result. Note that although the learned model 352 used when inference is performed has the same structure as the learning model 253 used when learning is performed, this is not limitative, but for example, the learned model 352 can be formed by extracting part necessary for inference from the learning model 253. With this, it is possible to reduce the data amount of the learned model 352 and reduce the processing time of inference.

In the processing system 100, when predicting the end of the service life of a component, first, the operating state (target state) of the device 400, in which the service life of the component can be reduced, is determined (determination step). Then, the remaining useful life is predicted (first prediction step), and the cumulative time determined by accumulating time in the target state is predicted (second prediction step). Then, a time at which the component reaches its life end is predicted based on the remaining useful life which is a prediction result in the first prediction step and the cumulative time which is a prediction result in the second prediction step (third prediction step). The time at which the component is predicted to reach its life end is set as the life end of the component.

FIG. 7 is a diagram showing an example of a relationship between the components and the target states. A table shown in FIG. 7 shows an example of the relationship between the components of the printer 600 and the target states of the components. Each component which is a target of the component life prediction is, preferably, an electrically controlled component. As shown in FIG. 7, in a case where the component is a print section heater that heats the print section 617, the target state is a printing state in which printing in the printer 600 is being executed. In a case where the component is a cleaning roller that cleans the print section 617, the target state is a post-printing state immediately after termination of the printing state. In a case where the component is a head C that ejects cyan ink in the print section 617, the target state is the printing state. In a case where the component is a head M that ejects magenta ink in the print section 617, the target state is the printing state. In a case where the component is a control circuit board A which is a component of the main board 610, the target state is both of a standby state (waiting state) in which the printer 600 waits in a power-ON state and the printing state. Thus, in the printer 600, the target state varies from one component to another (the same applies to the other devices 400). In the processing system 100, when predicting a time at which a component reaches its life end, to enhance the prediction accuracy, it is necessary to determine the target state of each component. Therefore, the table shown in FIG. 7 is used for determination of the target state. This table shown in FIG. 7 is stored in one of the cloud server 200, the edge server 300, and each device 400, but it is preferable that the table is stored in the data memory 614 of the printer 600 in advance.

Figure 8A:
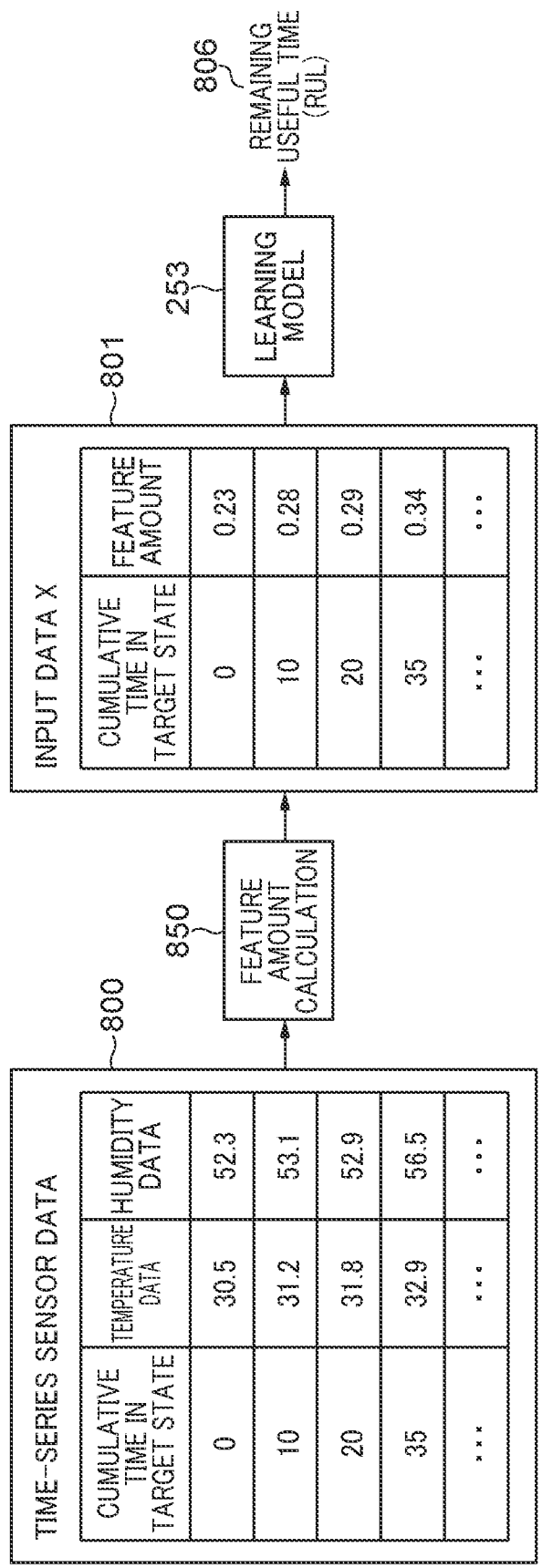

FIGS. 8A and 8B are conceptual diagrams showing an input and an output to and from a learning model that predicts the remaining useful life, and a relationship between cumulative time and the remaining useful life, respectively. The "remaining useful life" refers to remaining time during which a component can be used until the component reaches its life end. That is, the "remaining useful life" is an index that expresses how long a component can be used in its target state until the component reaches its life end. FIG. 8A is a diagram showing an input and an output to and from a learning model that predicts the remaining useful life with respect to a predetermined component. In the present embodiment, as the algorithm of the learning model, the exponential degradation model is used. The time-series sensor data 800 is data formed by a set of cumulative time in the target state and sensor data (temperature data and humidity data) in each cumulative period. Feature amount calculation 850 calculates feature amounts by processing the sensor data of the time-series sensor data 800. Each "feature amount" is associated with a target state and cumulative time and is, for example, a statistic value of input sensor data, data on which dimension reduction is performed, or data calculated by using a machine learning algorithm, such as deep learning, but is not particularly limited. As the feature amount of the exponential degradation model, a feature amount which is monotonously increased or monotonously reduced as time elapses is preferable. Note that the feature amount calculation 850 can be configured to include processing for selecting a proper feature amount on an algorithm-by-algorithm basis. The input data X (801) is data formed by a set of feature amounts output from the feature amount calculation 850 and cumulative time periods in the target state. The learning model 253 is a model which causes the input data X (801) to regress to the exponential degradation model. The input data X (801) is input to the learning model 253. With this, a remaining useful life 806 is output from the learning model 253 as an inference result. Note that the learning model 253 can learn the time-series sensor data 800 for each inference (prediction) of the remaining useful life 806, or can be configured to output the remaining useful life by inputting only the current cumulative time to the learned model. Further, although in the present embodiment, the degradation model is learned using all of the input data X (801), this is not limitative. For example, the degradation model can be learned using part of the whole input data X (801), and the rest of the input data X (801) can be used for evaluation of the prediction accuracy. Note that the start point of the cumulative time in the target state is not particularly limited, but for example, the start point can be set to, for example, a use start point of the device 400, or a time point at which an individual component is replaced.

FIG. 8B is a conceptual diagram showing a relationship between the cumulative time and the remaining useful life in the degradation model. As shown in FIG. 8B, the degradation model is a model capable of expressing an increase in the feature amount, which is caused as the cumulative time in the target state increases. In the present embodiment, when the feature amount reaches a life end determination threshold value with reference to which it is determined that a component has reached its life end, it is determined that the component has reached its life end. With this, even in a case where there is no prerecorded data indicating that a component actually reached its life end in the past, it is possible to predict the end of the component life. Note that the life end determination threshold value can be appropriately set for each component based on control conditions set with respect to the component and is preferably set to, for example, a value at which the feature amount deviates from an appropriate control range. For example, in a case of the life end determination threshold value for the print section heater, the life end determination threshold value can be set by calculating a feature amount using, for example, a temperature deviating from a range of the appropriate control temperature of the print section heater. As shown in FIG. 8B, a timing at which the component life predication is performed is indicated by a "x" mark. Then, in a case where the degradation model indicated by a solid line is used, the remaining useful life is indicated by a time period B up to a time point at which the feature amount reaches the life end determination threshold value. Further, in a case where a reliable section of the degradation model is considered, the remaining useful life is indicated by a time period not shorter than a time period A and not longer than a time period C, which are time periods each up to a time point at which the feature amount reaches the life end determination threshold value. Thus, in the component life prediction (first prediction step), by setting the life end determination threshold value with respect to changes in the feature amount over time, it is possible to quickly and easily predict the remaining useful life. Particularly, by using the graph shown in FIG. 8B, it is possible to more quickly predict the remaining useful life based on the predetermined time point ("x" mark) before the feature amount reaches the life end determination threshold value and the cumulative time to be accumulated until the feature amount reaches the life end determination threshold value. Further, in a case where the reliable section is set, it is possible to predict the remaining useful life with some margin. In place of the reliable section, an error can be set. The life end determination threshold value is stored in one of the cloud server 200, the edge server 300, and each device 400, but for example, in the case of the life end determination threshold value for the print section heater, the life end determination threshold value is preferably stored in the data memory 614 of the printer 600 in advance. The same applies to the graph shown in FIG. 8B.

FIG. 9 is a conceptual diagram showing an input and an output to and from the learning model that predicts the cumulative time in the target state when learning is performed. Note that although in the present embodiment, the learning model is set on a type basis of the target state, this is not limitative. For example, one learning model that predicts the cumulative time can be set to a plurality of target states. As shown in FIG. 9, the operation data 900 is used for input data X (901). The operation data 900 includes cumulative time in the target state on a predetermined time period basis. In the operation data 900, in a time period from 10:00 to 11:00 on Jun. 23, 2020, the cumulative time is 20 minutes, and in a time period from 11:00 to 12:00 on Jun. 23, 2020, the cumulative time is 15 minutes. Further, in a time period from 12:00 to 13:00 on Jun. 23, 2020, the cumulative time is 5 minutes, and in a time period from 13:00 to 14:00 on Jun. 23, 2020, the cumulative time is 45 minutes. As teacher data T (902), operation data 950 is used. The operation data 950 includes cumulative time in the target state in a predetermined time period. Note that the operation data 900 is assumed to be a collection of data items obtained before the data included in the operation data 950 was obtained. In the operation data 950, in a time period from 14:00 to 15:00 on Jun. 23, 2020, the cumulative time is 40 minutes. The learning model 253 performs learning for predicting the cumulative time in the target state, which is to be accumulated after the period of the operation data 900. By inputting the input data X (901) to the learning model 253, output data Y (903) is output from the learning model 253. Further, by supplying the output data Y (903) and the teacher data T (902) to a loss function 904, a deviation amount L (905) between the output data Y (903) and the teacher data T (902) is determined. Then, the learning model 253 is updated such that this deviation amount L (905) is reduced.

Figure 10:
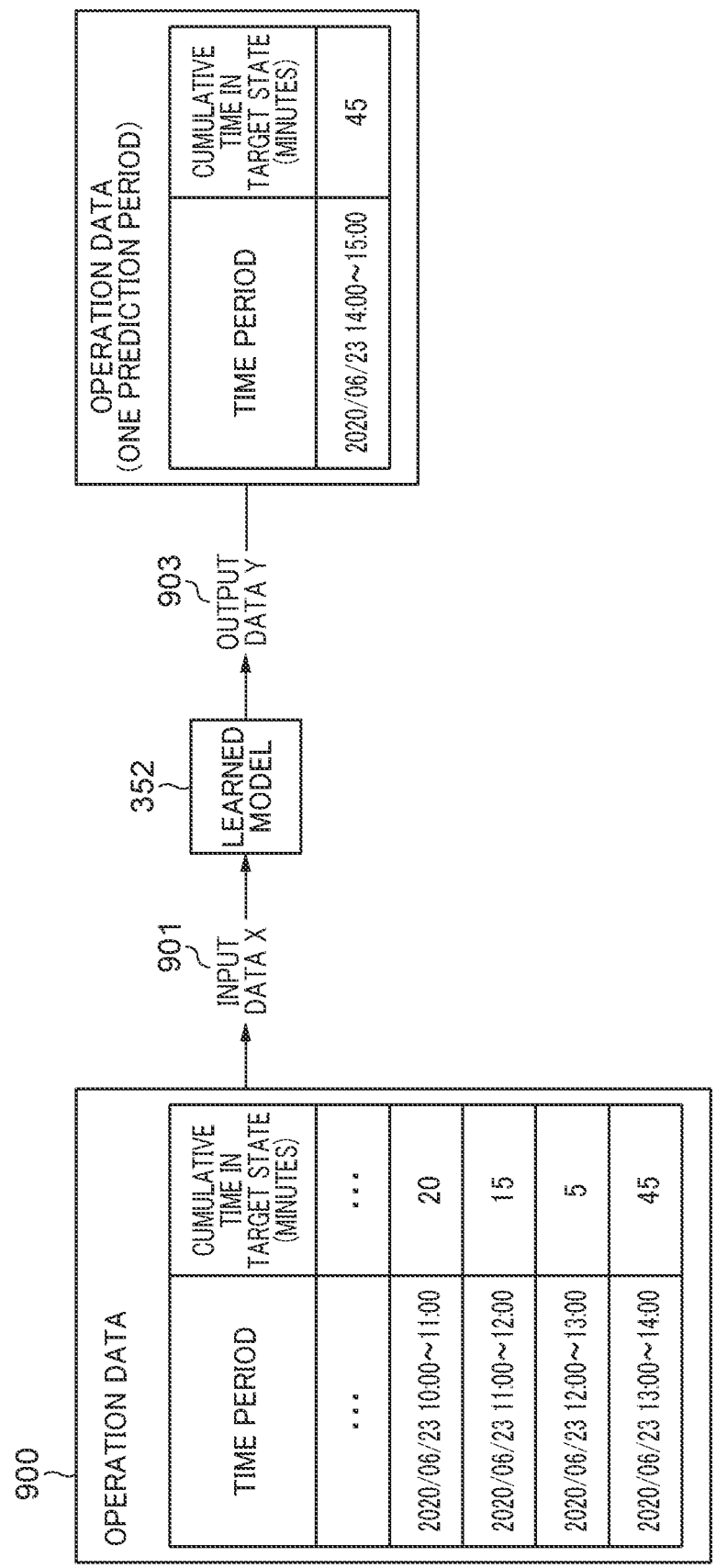
FIG. 10 is a conceptual diagram showing an input and an output to and from the learning model that predicts cumulative time in the target state when inference is performed.

FIG. 10 is a conceptual diagram showing an input and an output to and from the learning model that predicts the cumulative time in the target state when inference is performed. As shown in FIG. 10, by inputting the input data X (901) to the learned model 352, the output data Y (903) is output from the learned model 352. The output data Y (903) includes the cumulative time in the target state, which is to be accumulated after the periods included in the input data X (901). In the output data Y (903), for the time period from 14:00 to 15:00 on Jun. 23, 2020, the cumulative time is 45 minutes. Note that although in the present embodiment, the operation data 900, which is the input data X (901), includes cumulative time in the target state on a predetermined time period basis, this is not limitative. For example, the operation data 900 can include conditions, such as a day of week, the number of users of the device 400, and a peak season in which the device 400 is frequently used, and these conditions can be combined and used for learning and inference. Further, although the output data Y (903) includes one time period (the number of the prediction periods for predicting the cumulative time is one), this is not limitative, but for example, two or more time periods, i.e., two or more prediction periods can be included. In a case where two or more prediction periods are included, it is possible to more accurately predict the component life. Further, the cumulative time included in the output data Y (903) can be a value in which an inference error of the learned model 352 is taken into account (set).

Figure 11:
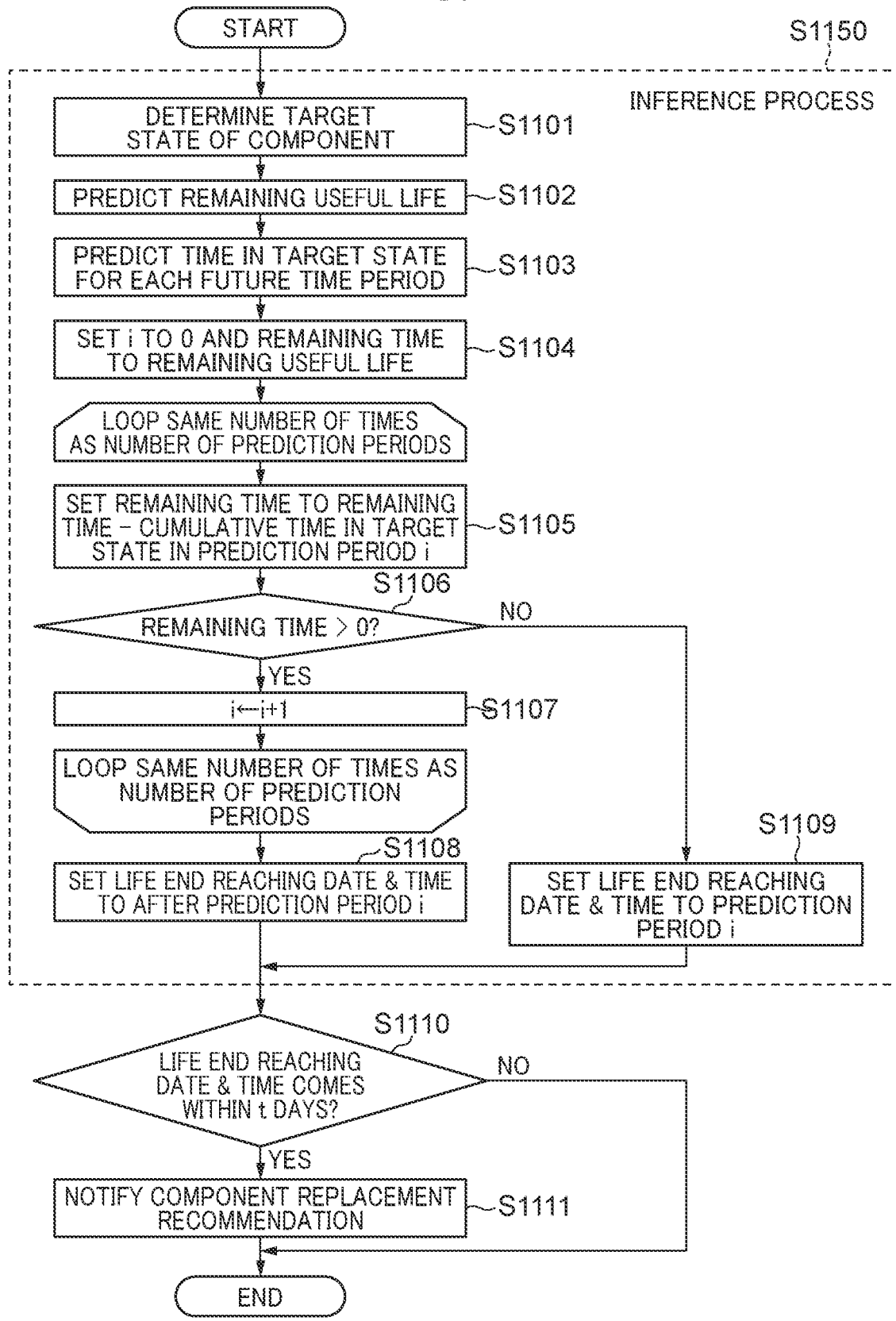
FIG. 11 is a flowchart of a component life prediction process.

FIG. 11 is a flowchart of a component life prediction process. Here, the main board 210 of the cloud server 200 performs control of the component life prediction process in FIG. 11 by way of example. Further, the target controlled by the main board 210 is, for example, the printer 600 and the edge server 300. Further, here, the number of time periods of the remaining useful life is determined to be one. That is, a case where no margin is set to the remaining useful life will be described by way of example. As shown in FIG. 11, in a step S1101, the main board 210 (determination unit) determines, based on the table shown in FIG. 7, a target state of a component as the target of the component life prediction (determination step).

In a step S1102, the main board 210 (first prediction unit) predicts the remaining useful life 806 of the component (first prediction step).

In a step S1103, the main board 210 (second prediction unit) predicts the cumulative time (output data Y (903)) in the target state determined in the step S1101, which is to be accumulated in each of future time periods (second prediction step).

A step S1104 et seq. are a process for predicting, based on the remaining useful life 806 as a result of the prediction in the step S1102 and the cumulative time 903 as a result of the prediction in the step S1103, the date and time at which the component reaches its life end after being used for the remaining useful life (third prediction step).

In the step S1104, the main board 210 (third prediction unit) sets a count i of the prediction period to "0" and sets remaining time to the remaining useful life.

Steps S1105 to S1107 after the step S1104 are a process that loops the same number of times as the number of prediction periods. In the step S1105, the main board 210 subtracts the cumulative time in the target state in the count i from the remaining time (remaining useful life).

In the step S1106, the main board 210 determines whether or not the remaining time is positive. If it is determined in the step S1106 that the remaining time is positive, the process proceeds to the step S1107. On the other hand, if it is determined in the step S1106 that the remaining time is not positive, i.e. negative, the process proceeds to a step S1109.

In the step S1107, the main board 210 increments the count i of the prediction period and sets the count i to "i+1".

Further, the remaining time being negative means that the cumulative time in the target state exceeds the remaining useful life, and in the step S1109, the main board 210 sets the life end reaching date and time to a prediction period indicated by the count i. For example, the life end reaching date and time can be expressed as "2020/06/23 14:00 to 15:00". Note that although the life end reaching date and time is expressed in a state having a margin, this is not limitative, but for example, the life end reaching date and time can be expressed as one time, such as "2020/06/23 14:00". After execution of the step S1109, the process proceeds to a step S1110.

Then, in a case where the remaining time does not become negative during the loop process of the steps S1105 to S1107, it is assumed that the component reaches its life end after the prediction periods, and hence, in a step S1108, the main board 210 sets the life end reaching date and time to a time after the prediction period indicate by the count i. The life end reaching date and time (reaching time) can be expressed as "unknown" or "uncertain" instead of being expressed as a time after the prediction period i. Thus, in a case where the life end reaching date and time is not included in the prediction periods, by expressing the life end reaching date and time as "uncertain" or "unknown", the user can consider that the component can be still sufficiently usable. After execution of the step S1108, the process proceeds to the step S1110.

In the step S1110, the main board 210 determines whether or not the life end reaching date and time will come within several days (notification threshold value t). If it is determined in the step S1110 that the life end reaching date and time will come within the notification threshold value t, the process proceeds to a step S1111. On the other hand, if it is determined in the step S1110 that the life end reaching date and time will not come within the notification threshold value t, the process is terminated. As the notification threshold value t in the step S1110, a value can be set on a component-by-component basis.

In the step S1111, the main board 210 provides a notification for prompting the user to replace the component (notification step). Further, together with this notification, information on the life end reaching time can be notified. Further, the notification for prompting the user to replace the component is preferably provided in a case where a time period between a time at which the information on the life end reaching time is notified and the life end reaching time is not longer than a predetermined time period. With this, it is possible to provide the notification for recommending replacement of the component not too early or not too late. Further, provision of the notification in the step S1111 can be performed by the device 400 having a component to be replaced, by using at least one notification means of an image on the display, a sound from a speaker, and light emission from a signal lamp.

Note that in FIG. 11, a step S1150 surrounded by broken lines is the whole process for inferring the life end reaching date and time.

By performing the above-described process, in the processing system 100, when predicting the life end reaching time at which a component reaches its life end, even if the information on the component service life is unknown, it is possible to predict the life end reaching time based on the remaining useful life and the cumulative time in the target state, and further, enhance the prediction accuracy. Further, it is possible to accurately grasp Mean Time Between Failure (MTBF).

Figure 12:
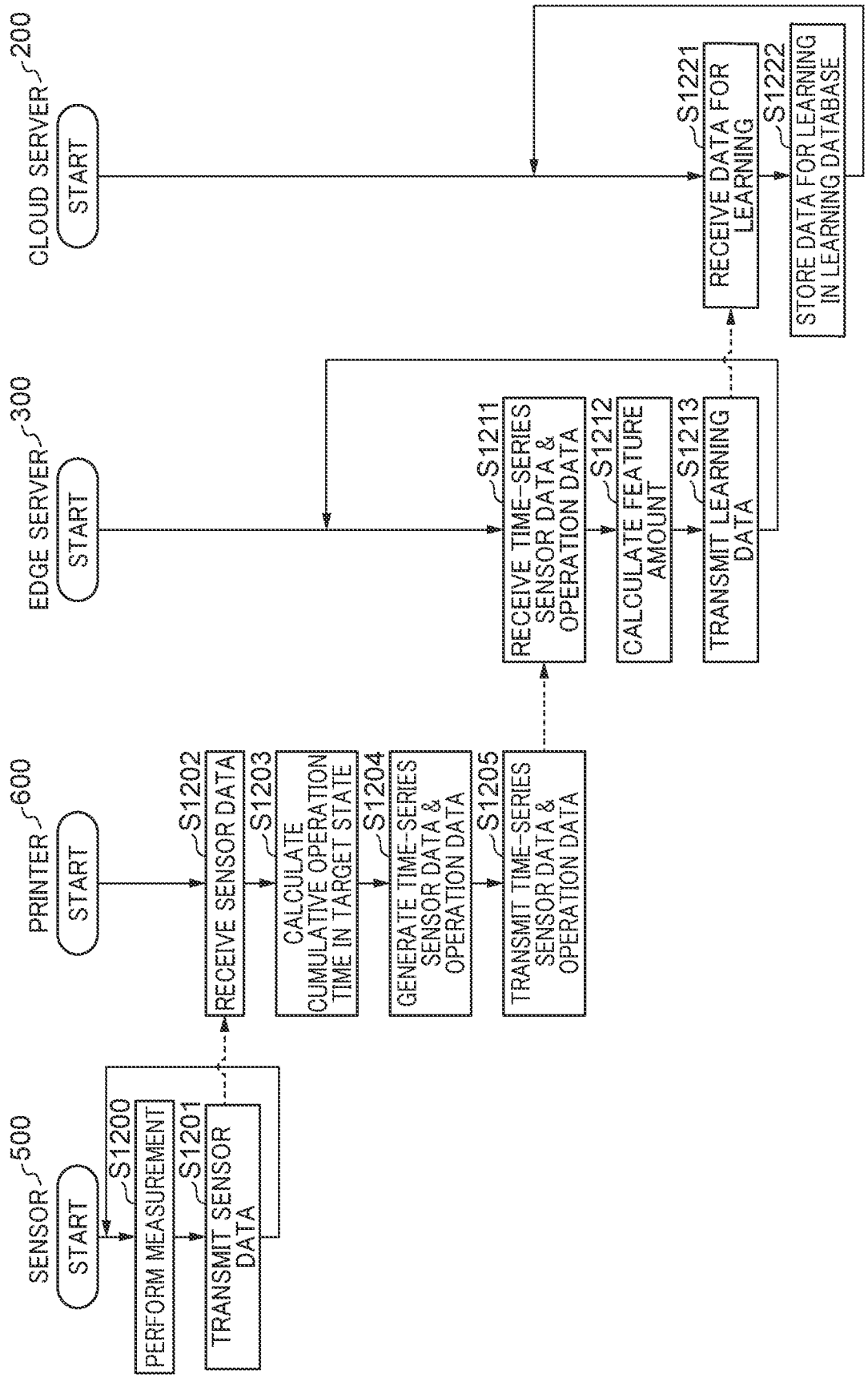
FIG. 12 is a flowchart of a process performed by the processing system when learning data is accumulated.

FIG. 12 is a flowchart of a process performed by the processing system when learning data is accumulated. As shown in FIG. 12, in the processing system 100, the printer 600 generates data for learning, by using the data received from the sensor 500, and the cloud server 200 stores the data for learning in the learning database. Note that although in the present embodiment, the time-series sensor data and the operation data are stored in the learning database at the same time, this is not limitative. For example, the time-series sensor data and the operation data can be stored in the learning database at different timings.

In a step S1200, the sensor 500 sequentially performs measurement. In a step S1201, the sensor 500 transmits the sensor data (measurement data) to the printer 600.

In a step S1202, the printer 600 receives the sensor data from the sensor 500. Note that the printer 600 can accumulate the sensor data in the data memory 614 of the printer 600 and collectively execute the following processing with respect to the accumulated data. In a step S1203, the printer 600 calculates the cumulative time to be included in the time-series sensor data 800 and the operation data 900. In a step S1204, the printer 600 generates the time-series sensor data 800 and the operation data 900. In a step S1205, the printer 600 transmits the time-series sensor data 800 and the operation data 900, which are generated in the step S1204, to the edge server 300.

In a step S1211, the edge server 300 receives the time-series sensor data 800 and the operation data 900, which have been transmitted from the printer 600 in the step S1205. In a step S1212, the edge server 300 calculates feature amounts based on the data received in the step S1211. Further, in the step S1212, the edge server 300 can also perform standardization, normalization, dimension reduction processing, such as main component analysis, and other processing for calculating the feature amounts, as required. Note that although in the present embodiment, calculation of the feature amounts is performed by the edge server 300, this is not limitative, but for example, calculation of the feature amounts can be performed by the printer 600 or the cloud server 200. In a step S1213, the edge server 300 transmits the data for learning to the cloud server 200.

In a step S1221, the cloud server 200 receives the data for learning, which has been transmitted from the edge server 300 in the step S1213. In a step S1222, the cloud server 200 stores the data for learning, which has been received in the step S1221, in the learning database (such as the data memory 214) of the cloud server 200. Note that in the process for transmitting a variety of data in the processing system 100, as the data to be transmitted in this process, only data of a difference from the data transmitted last time can be transmitted.

Figure 13:
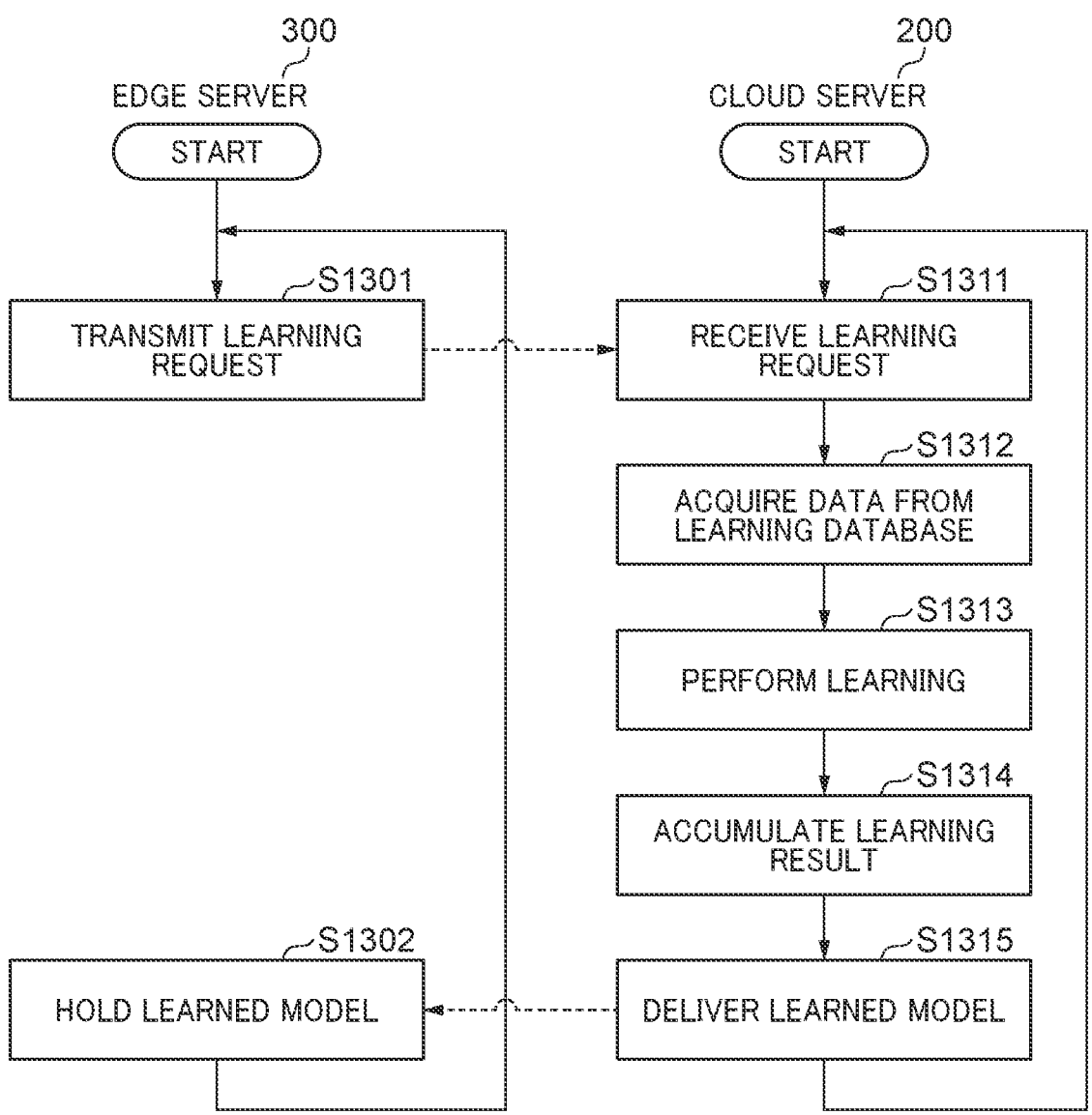
FIG. 13 is a flowchart of a process performed by the processing system when learning is performed.

FIG. 13 is a flowchart of a process performed by the processing system when learning is performed. As shown in FIG. 13, in the processing system 100, learning is requested from the edge server 300 to the cloud server 200, and the edge server 300 receives a learned model from the cloud server 200 and holds the received learned model.

In a step S1301, the edge server 300 transmits a learning request to the cloud server 200. Note that the learning request in the step S1301 can be performed using a reservation designating a date and time at which the learning is to be performed.

In a step S1311, the cloud server 200 receives the learning request transmitted from the edge server 300 in the step S1301. In a step S1312, the cloud server 200 acquires the data for learning, from the learning database. In a step S1313, the cloud server 200 executes learning. In a step S1314, the cloud server 200 accumulates a learning result obtained by the learning in the step S1313. Note that the learning result can include not only the learned model, but also information on the component service life prediction accuracy, the reliable section of the degradation model, and so forth. In a step S1315, the cloud server 200 delivers the learned model to the edge server 300.

In a step S1302, the edge server 300 holds the learned model delivered from the cloud server 200 in the step S1315.

Note that although in the present embodiment, the learning request is provided by the edge server 300, this is not limitative. Further, the edge server 300 and the cloud server 200 can be omitted from the processing system 100, and the printer 600 can be configured to perform the entire process. Further, although in the present embodiment, the learned model which has learned only the sensor data of the printer 600 is delivered, this is not limitative. For example, the learning data of the printer 600 is not necessarily required to be used for the learned model used by the printer 600 for inference. In this case, a learned model generated by learning data of a printer different from the printer 600 is delivered, and the printer 600 can use this model for inference. Further, a learned model generated by learning data of another printer can be caused to perform additional learning using the data of the printer 600, and the generated model can be used for inference.

Figure 14:
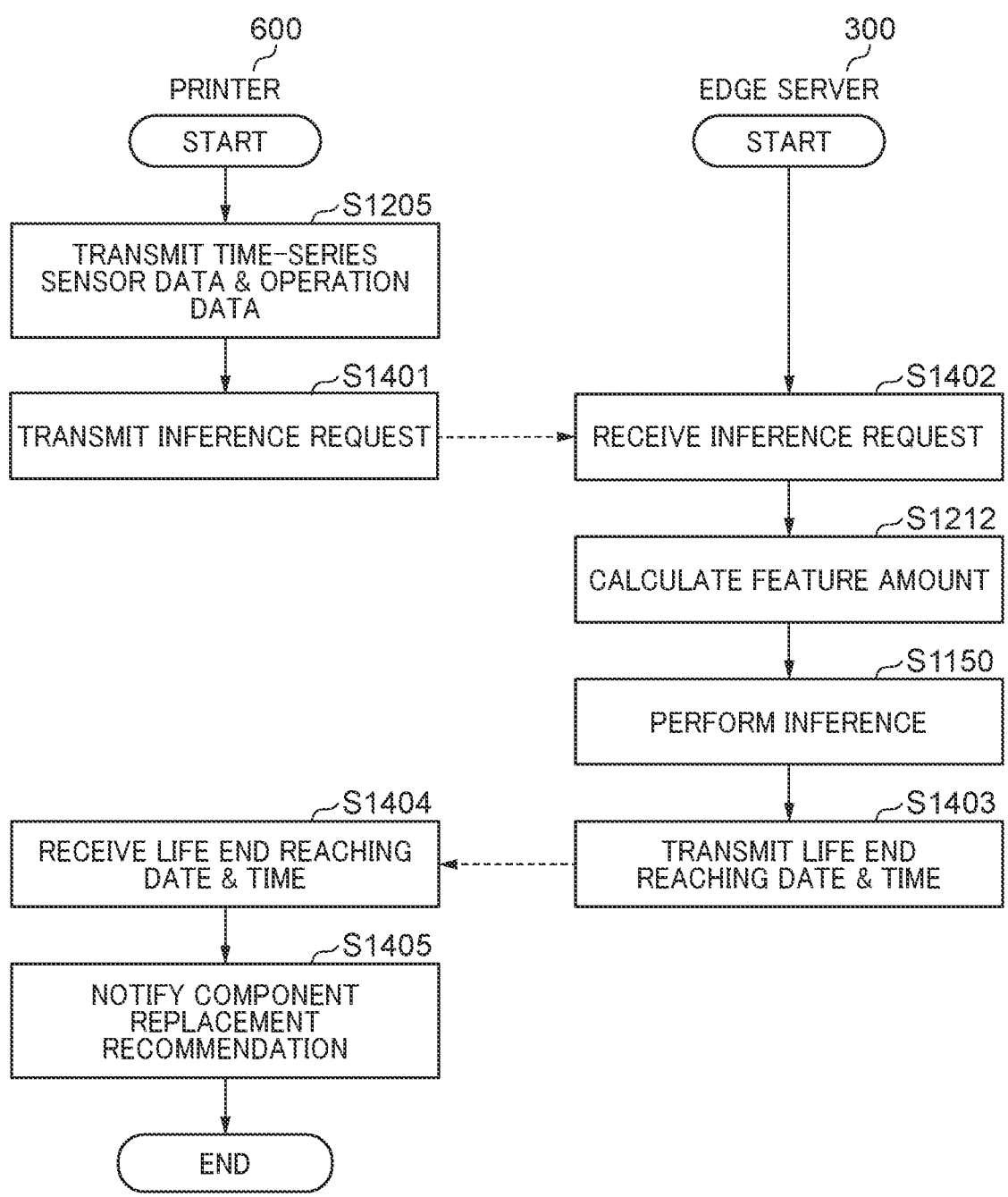
FIG. 14 is a flowchart of a process performed by the processing system when inference is performed.

FIG. 14 is a flowchart of a process performed by the processing system when inference is performed. As shown in FIG. 14, in the processing system 100, inference is requested from the printer 600 to the edge server 300, and the printer 600 receives the life end reaching date and time as a result of the inference and notifies the user of the received result. The process up to the step S1205 is the same as a corresponding part of the process in FIG. 12, and hence description thereof is omitted. Note that the process in FIG. 14 is performed by the printer 600 and the edge server 300 in the present embodiment, but this is not limitative.

In a step S1401 after execution of the step S1205, the printer 600 transmits an inference request to the edge server 300.

In a step S1402, the edge server 300 receives the inference request transmitted from the printer 600 in the step S1401. Then, the edge server 300 performs the feature amount calculation processing in the step S1212 and the inference process in the step S1150. Then, in a step S1403, the edge server 300 transmits the life end reaching date and time to the printer 600.

In a step S1404, the printer 600 receives the life end reaching date and time transmitted from the edge server 300 in the step S1403. In a step S1405, the printer 600 provides a component replacement recommendation notification based on the contents of the life end reaching date and time received in the step S1404. Note that the component replacement recommendation notification can be provided by using the console panel 605 of the printer 600 or the client terminal 401 connected to the printer 600, or can be provided on a terminal connected to the cloud server 200 or the edge server 300.

FIG. 15 is a diagram showing an example of a component replacement recommendation notification screen. The component replacement recommendation notification screen shown in FIG. 15, denoted by reference numeral 1500, includes a component name 1501, life end reaching date and time 1502, an action status 1503, and an ordering button 1504. Although in FIG. 15, the life end reaching date and time 1502 is determined to one value, this is not limitative. For example, taking prediction errors of the remaining useful life and the cumulative time into consideration, the life end reaching date and time 1502 can be a time period during which the component is estimated to reach its life end, i.e. can be set to a time period with some margin. Note that the life end reaching date and time 1502 includes a year, a month, a day, and an hour, but is only required to include at least a year, a month, a day, and an hour, out of a year, a month, a day, an hour, a minute, and a second. With this, the user can roughly grasp the time indicated by the life end reaching date and time 1502. The action status 1503 is a status of the action taken after the component replacement recommendation notification is provided. For example, in a case where the component has not been replaced and no action has been taken after the component replacement recommendation notification was provided, "no action" is displayed in the action status 1503. On the other hand, in a case where some action has already been taken for replacement of the component, "ordered" is displayed in the action status 1503. The ordering button 1504 is a button for ordering a component being selected on the component replacement recommendation notification screen 1500 for performing replacement of the component. On the component replacement recommendation notification screen 1500, the print section heater is in a selected state, and when the ordering button 1504 is operated in this state, a print section heater for replacement is ordered. Note that the information for displaying the component name 1501, the life end reaching date and time 1502, and the action status 1503 can be managed by any part of the processing system 100. Further, the component replacement recommendation notification screen 1500 can be configured such that arrangement of a service person for replacement of a component, and generation of a component replacement schedule can be executed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-011809 filed Jan. 30, 2023, which is hereby incorporated by reference herein in its entirety.

What is claimed is:

1. A method of predicting a life end of a component provided in an apparatus, comprising:
    determining an operation state of the apparatus, which can reduce service life of the component;
    predicting a remaining useful life in which the component can be used until the component reaches the life end;
    predicting cumulative time determined by accumulating time in the operation state; and
    predicting a time at which the component reaches the life end, based on a result of predicting the remaining useful life and a result of predicting the cumulative time.

2. The method according to claim 1, wherein the predicting the remaining useful life includes predicting the remaining useful life by setting a life end determination threshold value with reference to which it is determined that the component has reached the life end, for a change over time in a feature amount associated with the operation state.

3. The method according to claim 2, wherein the feature amount is associated with the cumulative time, and wherein the predicting the remaining useful life includes predicting the remaining useful life based on a predetermined time point before the feature amount reaches the life end determination threshold value and the cumulative time to be accumulated until the feature amount reaches the life end determination threshold value.

4. The method according to claim 2, wherein the component is an electrically controlled component, and wherein the life end determination threshold value is set based on a control condition set with respect to the component.

5. The method according to claim 2, wherein the predicting the remaining useful life includes predicting the remaining useful life by setting a reliable section or an error.

6. The method according to claim 2, wherein the predicting the cumulative time includes predicting the cumulative time by setting an error.

7. The method according to claim 2, wherein the predicting the cumulative time includes setting a prediction period for predicting the cumulative time.

8. The method according to claim 7, wherein the predicting the life end reaching time includes expressing, in a case where the life end reaching time is not included in the prediction period, the life end reaching time as uncertain or unknown.

9. The method according to claim 7, wherein the predicting the life end reaching time includes predicting the life end reaching time based on time calculated by subtracting the cumulative time from the remaining useful life.

10. The method according to claim 1, wherein the life end reaching time includes at least a year, a month, a day, and an hour out of a year, a month, a day, an hour, a minute, and a second.

11. The method according to claim 1, further comprising notifying information on the life end reaching time after predicting the life end reaching time.

12. The method according to claim 11, wherein the notifying includes performing notification for prompting replacement of the component, in a case where a time period between a time point at which the notification is performed and the life end reaching time is not longer than a predetermined time period.

13. A component life prediction system that predicts a life end of a component provided in an apparatus, comprising:

a determination unit configured to determine an operation state of the apparatus, which can reduce service life of the component;

a first prediction unit configured to predict a remaining useful life in which the component can be used until the component reaches the life end;

a second prediction unit configured to predict cumulative time determined by accumulating time in the operation state; and a third prediction unit configured to predict a time at which the component reaches the life end, based on a result of prediction performed by the first prediction unit and a result of prediction performed by the second prediction unit.

14. A non-transitory computer-readable storage medium storing a program for causing a computer to execute a method of predicting a life end of a component provided in an apparatus, wherein the method comprises:

determining an operation state of the apparatus, which can reduce service life of the component;

predicting a remaining useful life in which the component can be used until the component reaches the life end;

predicting cumulative time determined by accumulating time in the operation state; and predicting a time at which the component reaches the life end, based on a result of predicting the remaining useful life and a result of predicting the cumulative time.

* * * * *